Jan. 18, 1938.　　　　　S. COHEN　　　　　2,105,878
VARIABLE CONDENSER
Filed May 8, 1934　　　　2 Sheets-Sheet 1

INVENTOR
Samuel Cohen
BY
ATTORNEY

Jan. 18, 1938. S. COHEN 2,105,878
VARIABLE CONDENSER
Filed May 8, 1934 2 Sheets-Sheet 2
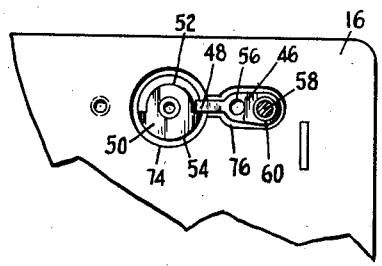
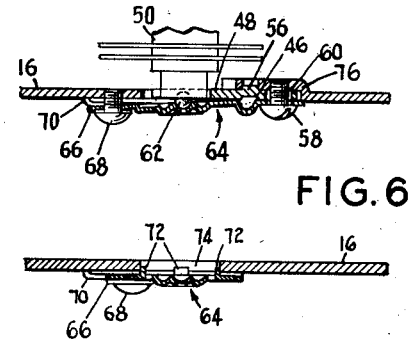
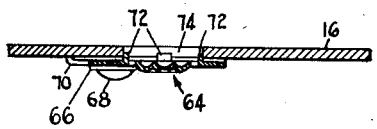
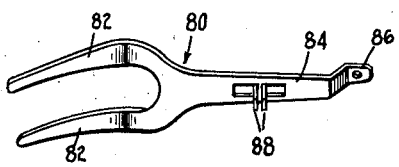
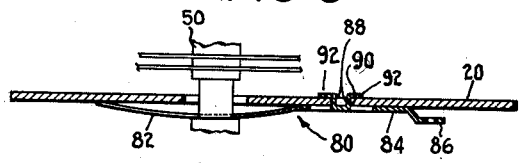
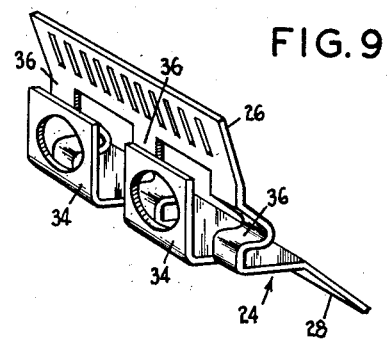
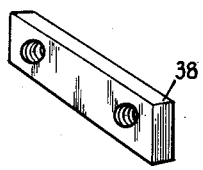
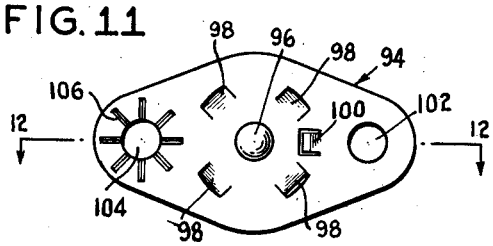
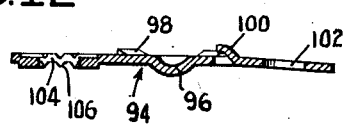
INVENTOR
Samuel Cohen
BY
ATTORNEY Patented Jan. 18, 1938

2,105,878

UNITED STATES PATENT OFFICE 2,105,878

VARIABLE CONDENSER

Samuel Cohen, Brooklyn, N. Y., assignor to General Instrument Corporation, New York, N. Y., a corporation of New York Application May 8, 1934, Serial No. 724,490

19 Claims. (Cl. 175—41.5)

This invention relates to variable condensers.

In modern condenser construction, particularly of the multiple or gang type, the groups of stator plates are held in spaced parallel relation by straps or combs, and the resulting stator sections are fixedly mounted in a rigid frame. The frames may vary slightly in dimension or shape due to manufacturing difficulties and tolerance, and this leads to slight but nevertheless troublesome distortion or warping of the stator sections when they are locked tightly to the sides of the frame. The primary object of the present invention is to overcome this difficulty and to provide a stator mounting which will be simple and secure, as heretofore, but which will be somewhat yieldable, sufficiently so to accommodate inequalities of the frame. The construction may be thought of as a floating mounting, but it will be understood that the stator is firmly supported, it being yieldable only in the sense that the connection between the stator and the frame will give before the stator assembly will itself warp or deform.

Further objects of my invention center about the support of the inner end of the condenser shaft, and reside in the provision of a limitedly adjustable end stop and a single ball thrust bearing with adjustable means for regulating the spring tension applied to the ball bearing.

To the accomplishment of the foregoing and other objects which will hereinafter appear, my invention consists in the condenser elements and their relation one to the other, as hereinafter are more particularly described in the specification and sought to be defined in the claims. The specification is accompanied by drawings, in which:

Fig. 4 is a view similar to Fig. 3 but with the bearing plate removed to show the end stop;

Fig. 5 is a horizontal section taken in the plane of the line 5—5 in Fig. 3;

Fig. 6 is a section taken in the plane of the line 6—6 in Fig. 3, with the condenser shaft removed;

Fig. 7 is a perspective view of a contact spring embodying a feature of my invention;

Fig. 8 is a section taken in the plane of the line 8—8 in Fig. 2, and shows the contact spring mounted in place;

Fig. 9 is a perspective view of an improved spacer and support member or comb constructed in accordance with my invention;

Fig. 10 shows a threaded block used with the comb of Fig. 9;

Fig. 11 shows a modified bearing plate, which itself carries a stop finger; and

Fig. 12 is a section taken in the plane of the line 12—12 of Fig. 11.

Figure 1:
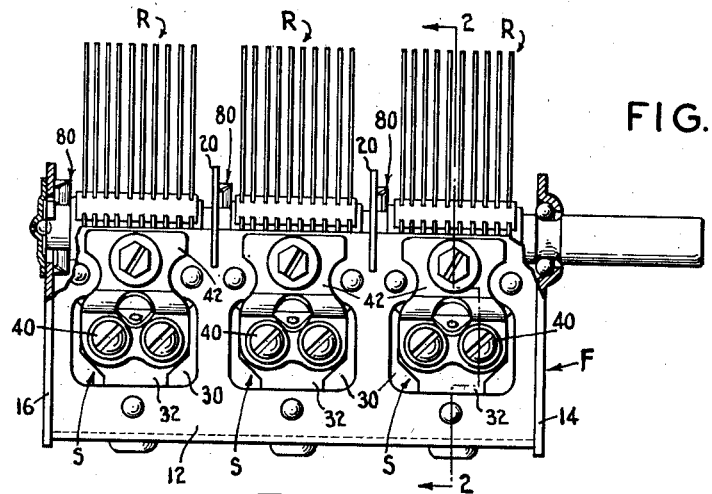
Fig. 1 is a side elevation of a condenser embodying features of my invention.
Figure 2:
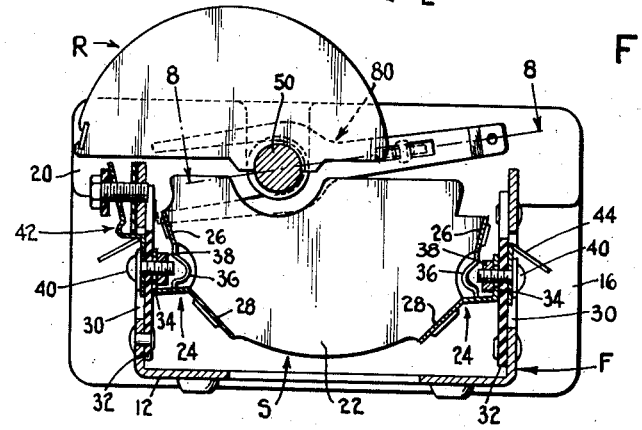
Fig. 2 is a transverse section taken in the plane of the line 2—2 of Fig. 1.

Referring to the drawings and more particularly to Figs. 1 and 2 thereof, I show a multiple or gang condenser comprising a rigid frame F receiving and housing a plurality, in this case three, stator sections S. The frame F also journals a common rotor shaft carrying rotor sections R adapted to interleave with the stator sections S.

Figure 3:
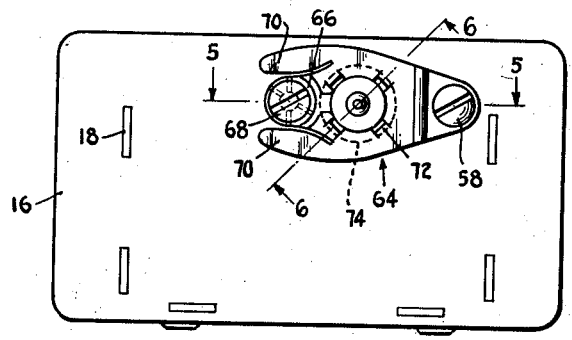
Fig. 3 is an end view of the condenser.

The frame F is made of heavy gauge metal and comprises a trough-shaped part 12 and end plates 14 and 16 rigidly secured thereto by appropriately staked or riveted tongue and slot connections 18 (Fig. 3). The frame further includes transverse shields or intermediate plates 20 which are also secured to the member 12 and which help to stiffen and strengthen the frame assembly.

Each stator section S comprises a plurality of similarly shaped plates 22 which are held in spaced parallel relation by spacers or combs 24, best shown in Figs. 2 and 9. The combs preferably include upper and lower straps 26 and 28 which extend in parallel direction but which lie in angularly related planes, the lower straps 28 coming partially beneath the plates 22. The stator plates and the combs are securely interconnected by staked tongue and slot connections, resulting in a stator assembly which is comparatively strong and rigid.

The side walls of frame F are cut away at the sides of the stator sections, as is indicated at 30, and strips of insulation 32 are fastened in place across the resulting windows. In accordance with past practice, the combs 24 are secured directly to and tightly against the insulation strips at the sides of the frame. I have found that, while the stator sections S are sturdy, they are not comparable in strength with the frame F, and that slight warping or deformation of the stator section may result from inaccuracies in frame dimension. These distortions of the stator are ordinarily imperceptible but manifest themselves in the electrical characteristics, specifically the capacitance curves of the condenser sections.

In accordance with my invention, this difficulty is overcome by somewhat yieldingly or floatingly mounting the stator sections in the frame. To this end each comb 24 is provided with outwardly projecting mounting lugs or arms 34 preferably formed integrally with the comb, as is most clearly shown in Fig. 9. It will be noted that the lugs or arms are struck free of the comb and are connected thereto at only one end, in this case the lower end, as a result of which they are somewhat bendable relative to the body of the comb. In effect, the lugs 34 are arms which extend transversely of the straps, and have a width, in the direction of the straps 26 and 28, which is only a fraction of the length of the straps. This proportioning of the arms also helps make the same yieldable relative to a construction in which a full-length unincised middle portion of the comb is bent outwardly and solidly secured to the insulation strips 32 of the frame.

The upper and lower straps 26 and 28 of the comb are interconnected by intermediate strips of metal 36, and these strips of metal are made of sufficient length in a direction transverse of the straps 26 and 28 to provide ample material for the mounting lugs or arms 34. The strips 36 are then reversely bent, as shown, in order to bring the straps 26 and 28 into desired relationship or spacing despite the excess metal therebetween, and to maintain ample clearance immediately behind arms 34 to receive a threaded block 38, best shown in Fig. 10. The block 38 receives the screws 40 which mount the stator on the frame, as is best shown in Fig. 2.

The connecting strips or arms 36 have a width in the direction of the length of straps 26 and 28, which is only a small fraction of the length of the straps. In other words, the body of the comb between the straps is greatly incised or cut away. This is itself of advantage in facilitating the assembly of the stator plates and combs, for it increases the working tolerance and affords some adjustment of one strap relative to the other.

It will be understood that to mount the stator sections within the frame, it is merely necessary to insert a block 38 in each comb and to lower the stator section into the appropriate compartment of the frame, and to thereupon thread the screws 40 through the insulation strips 32, the mounting lugs 34, and into the block 38. It will also be understood that upon tightening the screws 40, the lugs 34 will yield or give sufficiently to seat themselves on the insulation strips of the frame without in any way deforming the stator section. It goes without saying that a trimmer condenser plate such as the plate 42 may be received by screws 40, and that a soldering lug such as the lug 44 may similarly be received by screws 40.

Further features of my invention center about the end stop and end thrust bearing of the condenser. Referring to Figs. 4 and 5, the motion limiting or end stop of the condenser includes a stop finger 46 one end 48 of which comes adjacent the condenser shaft 50. The shaft is cut away for a little more than half of its periphery, forming the small radius portion 52 which provides clearance for the finger 48, and a large radius portion 54 the ends of which cooperate with the finger 48 to stop or limit the motion of the condenser shaft.

In order to make the stopping point of the rotor adjustable, I vary the location of the stop finger 46 on the end plate 16 of the condenser frame. Only slight adjustment is needed, and this I obtain by pivoting the finger 46 at 56 and adjustably locking the other end of the finger by a screw 58 threaded into the frame plate 16. Screw 58 passes through a hole 60 which is oversize to provide clearance around the screw. The stop finger 48 may therefore be oscillated about the pivot 56 to desired position, whereupon the screw 58 may be tightened. The pivot 56 is most simply provided by punching or displacing metal inwardly from the finger, as is best shown in Fig. 5, the resulting boss mating with an aperture in frame plate 16.

The end thrust bearing for the condenser shaft may be described with reference to Figs. 3, 5, and 6. The shaft is supported by a single ball bearing 62 seated partially in the end of the shaft and partially in an outwardly pressed recess on a bearing plate 64. Bearing plate 64 is held tightly against the end plate 16 of the condenser by a tight screw 58 which is preferably the same screw that is used to lock the stop finger 46 in place. The plate 64 is preferably made of resilient or spring metal, and the opposite end 66 may be adjusted toward or from the end plate 16 by an adjusting screw 68. The side extensions 70 from the middle portion of the plate are preferably bent inwardly so as to bear against the end plate of the condenser. Differently expressed, the movable end of the plate is incised to form three fingers the outer ones of which are bent into engagement with the end plate, and the middle one of which is controlled by the adjusting screw 68. This middle finger 66 is, of course, sufficiently rigidly connected to the seat of the ball bearing to control the tension and consequently the friction of the bearing. A plurality, in this case four, locating lugs 72 are struck forwardly from the bearing plate, as is best shown in Fig. 6, and these mate with the enlarged aperture 74 in the condenser end plate 16. The tight screw 58 and locating lugs 72 are alone enough to prevent edgewise displacement of the bearing plate, and the lugs 72 accommodate axial movement when screw 68 is adjusted. The adjustment is retained by radial ridges engaging the screw head, these ridges being indicated in dotted lines at screw 68 in Fig. 3, and being like the ridges 106 in Fig. 11.

In order to permit the bearing plate 64 to be received directly upon the outer surface of the end plate 16, the stop finger 46 heretofore described is preferably set into a recess 76 in end plate 16, as is best shown in Figs. 4 and 5. The end plate is pressed inwardly to form a shallow pocket which receives the stop finger 46, the outer surface of the stop finger then coming substantially flush with the main surface of the end plate. The recess 76 is, of course, made slightly greater in area than the stop finger, as shown in Fig. 4, in order to accommodate limited movement or adjustment of the stop finger. With this construction the bearing plate 64 may be applied to the end plate, just as would be the case in the absence of the stop mechanism. At the same time, the stop mechanism and bearing mechanism are intimately combined compactly and with a minimum of parts.

Electrical contact with the rotor sections R is obtained by means of contact springs 80 the construction of which is clearly evident from inspection of Figs. 2 and 7. The bifurcated ends 82 straddle the condenser shaft, while the handle portion 84 bears against the condenser frame. The tip 86 is bent away from the condenser frame to facilitate soldering electrical wiring thereto. Sideward displacement of the contact spring is prevented by the condenser shaft 50 and tongues 88 passing through mating holes 90 in the condenser frame end plates, and shields 20. In accordance with my invention, these tongues 88 are struck from opposite directions toward one another and are of substantial length sufficient to pass entirely through the holes 90 and to then be bent outwardly to form locking tabs 92, as is clearly shown in Fig. 8. This construction prevents accidental dislodgment and loss of the contact spring, as during shipment, or, more importantly, during the operation of soldering a wire to the lug 86.

A modified bearing plate which dispenses with the necessity for a separate stop finger is shown in Figs. 11 and 12. The bearing plate 94 is lozenge-shaped and is outwardly recessed at 96 to seat the ball bearing. A plurality of lugs are struck inwardly at 98, these lugs corresponding in function to the lugs 72 in Fig. 6, that is, they locate the bearing plate relative to the oversize aperture 74 in the end plate of the condenser. A lug 100 is struck inwardly and appropriately dimensioned and located to act as a stop finger for limiting the motion of the condenser shaft. The condenser end plate needs no pocket or recess, and may be left flat.

One end of the bearing plate is perforated at 102 to receive the tight screw 58, and the said end of the bearing plate is bent outwardly (downwardly in Fig. 12), so that when the screw 58 is tightened, the remainder of the bearing plate moves outwardly or away from the end plate of the condenser, thus affording room for adjustment. As before, the adjustment is obtained by means of a screw 68 passing through an aperture 104 and threaded in the end plate. The bearing plate may be radially ridged at 106, and the screw head matingly ridged, to lock the screw at any desired adjustment.

The holes 102 and 104 are oversize relative to the screws passing therethrough, and this provides clearance for a slight oscillation or adjustment of the entire bearing plate about the condenser shaft axis, thus providing for adjustment of the end limit of the condenser movement. Considered as a stop mechanism, it will be understood that the finger 100 is enlarged to carry locating lugs 98 which guide the finger 100 for oscillation about the axis of the condenser shaft. The adjustment is fixed by the tight screw passing through the hole 102. Considered as a bearing, the seat for the ball bearing is maintained in proper alignment by the locating lugs 98, while the bearing plate is held on the condenser frame by the tight screw passing through hole 102, and the friction or tightness of the bearing is adjusted by the screw passing through the hole 104.

It is believed that the mode of constructing and using my improved variable condenser, as well as the many advantages thereof, will be apparent from the foregoing detailed description thereof. The combs are individually weakened somewhat, apart from the straps, thus facilitating assembly of the stator, yet the stator sections are formed accurately and sturdily, and are so mounted in the rigid frame of the condenser that no deformation or warping of the sections can result during the mounting operation. The stator mountings are fully as simple and advantageous as any used heretofore, but possess the additional advantage of being yieldable relative to the stator sections—at least sufficiently so to prevent any distortion of the stator sections. The condenser is provided with an adjustable end stop. The thrust bearing at the inner end of the condenser shaft is also adjustable for tension or friction, and the end stop and bearing mechanisms are advantageously intimately combined. The contact springs for the rotor are so constructed as to prevent accidental dislodgment during shipment, soldering, or use.

It will be apparent that while I have shown and described my invention in preferred form, many changes and modifications may be made in the structure disclosed, without departing from the spirit of the invention, defined in the following claims.

I claim:

1. A spacer and support member or comb for a variable condenser, said member comprising a holding portion or strap, and mounting lugs projecting outwardly therefrom and adapted to be secured to the frame of a condenser, said lugs being so connected to the comb as to be somewhat yieldable relative thereto.

2. A spacer and support member or comb for a variable condenser, said comb comprising a piece of sheet metal shaped and bent to form an upper holding portion or strap, a lower holding portion or strap, and mounting lugs struck out between said straps and adapted to be secured to the frame of a condenser, said lugs being so connected to the comb as to be somewhat yieldable relative thereto.

3. A spacer and support member or comb for a variable condenser, said comb comprising a piece of sheet metal shaped and bent to form an upper holding portion or strap, a lower holding portion or strap, interconnecting portions, and mounting lugs struck out between said interconnecting portions and adapted to be secured to the frame of a condenser, said lugs being connected only at one end to said comb and being dimensioned to receive a threaded block, the length of the interconnecting portions being adequate for formation of the lugs, and said interconnecting portions being so bent between the upper and lower straps as to clear the block while spacing the straps in desired relation.

4. A spacer and support member or comb for a variable condenser, said comb comprising a piece of sheet metal shaped and bent to form an upper holding portion or strap, a lower holding portion or strap extending in a direction parallel to but lying in a plane angularly related to the plane of the first strap, interconnecting portions bent to channel shape, and mounting lugs struck out between said interconnecting portions and adapted to be secured to the frame of a condenser, said lugs being so connected at one end only to said comb as to be somewhat yieldable relative to the comb.

5. A variable condenser comprising a rigid frame, a group of stator plates arranged in spaced parallel relation, combs connecting the edges of said stator plates, and mounting means somewhat yieldably connecting the combs to the frame, whereby changes in frame dimension do not cause deformation of the stator assembly.

6. A variable condenser comprising a rigid frame, insulation at the side walls thereof, a group of stator plates arranged in spaced parallel relation, combs connecting the edges of said stator plates, said plates and combs forming a rigid stator assembly, and mounting means firmly but somewhat yieldably connecting the stator to the insulation of the frame, said mounting means being more yieldable than the frame and more yieldable than the stator assembly.

7. A variable condenser comprising a rigid boxlike frame, insulation strips at the side walls thereof, a group of stator plates arranged in spaced parallel relation, combs at the sides of said stator plates, said plates and combs being rigidly interconnected by appropriate staked tongue and slot connections, and mountings formed integrally with the combs but somewhat yieldable relatively thereto, fixedly secured to said insulation strips.

8. A variable condenser comprising a rigid frame, insulation strips at the sides thereof, a group of stator plates arranged in spaced parallel relation within said frame, a plurality of spacer combs including upper and lower straps secured to the plates, said plates and straps forming a stator assembly, and mounting lugs formed integrally with said combs and rigidly secured to the insulation strips, said lugs being connected only at one end to said combs, whereby said lugs are more yieldable than the frame and more yieldable than the stator assembly.

9. A variable condenser comprising a rigid frame, insulation strips at the sides thereof, a group of stator plates arranged in spaced parallel relation within said frame, a plurality of spacer combs made of sheet metal shaped and bent to form upper and lower straps each secured to the plates by staked tongue and slot connections, connecting portions interconnecting the upper and lower straps, and mounting lugs struck out between said interconnecting portions and rigidly secured to the insulation strips, said lugs being so connected as to be yieldable relative to the combs.

10. A variable condenser comprising a rigid frame, insulation strips at the sides thereof, a group of stator plates arranged in spaced parallel relation within said frame, a plurality of spacer combs made of sheet metal shaped and bent to form upper and lower straps each secured to the plates by staked tongue and slot connections, said plates and combs forming a stator assembly, the lower straps lying in a plane angularly related to the upper straps and coming partially beneath the condenser plates, bent connecting portions interconnecting the upper and lower straps, and mounting lugs struck out between said interconnecting portions and rigidly secured to the insulation strips, said lugs being connected only at one end to said combs, whereby said lugs are more yieldable than the frame and more yieldable than the stator assembly.

11. Combined end stop and thrust bearing mechanism for a variable condenser, said mechanism including an axially adjustable thrust bearing plate for holding a ball bearing at the end of the condenser shaft, said plate being tightly secured at one end to the condenser frame by a tight screw and having an adjusting screw at the opposite end, the intermediate part of the plate surrounding the ball bearing having a plurality of lugs struck inwardly therefrom and dimensioned to fit within an oversize aperture in the end plate concentric with the condenser shaft, whereby said ball bearing seat is properly located during axial adjustment of the plate, said plate further carrying a stop finger struck inwardly therefrom, the end of the condenser shaft being reduced in radius for a part of its periphery for cooperation with said stop finger, the plate being oscillatable relative to the tight and adjusting screws in order to afford adjustment of the motion limiting position of the stop finger.

12. A single ball end thrust bearing for a condenser, said bearing including an adjustable bearing plate for holding the ball bearing at the end of the condenser shaft, said plate being secured at one end to the end plate of the condenser and having an adjusting screw at its opposite end, another part of the plate having a locating lug dimensioned to fit within an aperture in the end plate.

13. A single ball end thrust bearing for a condenser, said bearing including an adjustable bearing plate for holding the ball bearing at the end of the condenser shaft, said plate being tightly secured at one end to the end plate of the condenser and having an adjusting screw at its opposite end, the intermediate part of the plate surrounding the ball bearing having a plurality of lugs struck inwardly therefrom and dimensioned to fit within an aperture in the end plate, whereby said plate is held against edgewise displacement, and is adjustable for tension by means of the adjusting screw.

14. A spacer and support member or comb for the stator of a variable condenser including a frame, said comb comprising a sheet metal plate shaped and bent to form an upper holding portion or strap, a lower holding portion or strap, and bent portions located between the upper and lower strap portions, said plate being so cut between the upper and lower straps that the bent portions form members which extend transversely of the straps and which have a width in the direction of the length of the straps that is only a fraction of the length of the comb, and means to facilitate attachment of the comb to the condenser frame in order to support the stator within the frame.

15. A spacer and support member or comb for the stator of a variable condenser including a frame, said comb comprising a piece of sheet metal shaped and bent to form an upper holding portion or strap, a lower holding portion or strap extending in a direction parallel to but lying in a plane angularly related to the plane of the first strap, and interconnecting portions bent to channel shape, said piece of sheet metal being substantially cut away between the interconnecting portions, the interconnecting portions thereby forming members which extend transversely of the straps and which have a width only a fraction of the over-all length of the strap, and means to facilitate attachment of the comb to the condenser frame in order to support the stator within the frame.

16. A variable condenser comprising a frame, insulation strips at the sides thereof, a group of stator plates arranged in spaced parallel relation within said frame, a plurality of spacer combs made of sheet metal shaped and bent to form upper and lower straps each secured to the plates by tongue and slot connections, said plates and combs forming a stator assembly, the lower straps lying in a plane angularly related to the upper straps and coming partially beneath the plates, support arms connected to the combs at the lower straps, said arms extending transversely of the straps and having a width only a fraction of the length of the straps, and means connecting said arms to the insulation strips at the sides of the condenser frame.

17. A variable condenser comprising a frame, insulation strips at the sides thereof, a group of stator plates arranged in spaced parallel relation within said frame, a plurality of spacer combs made of sheet metal shaped and bent to form upper and lower straps each secured to the plates by tongue and slot connections, said plates and combs forming a stator assembly, the lower straps lying in a plane angularly related to the upper straps and coming partially beneath the plates, bent connecting portions interconnecting the upper and lower straps, said spacer combs being substantially cut away whereby the bent connecting portions extend transversely of the upper and lower straps and have a width only a fraction of the length of the straps, and means connecting said combs to the insulation strips at the sides of the condenser frame.

18. A variable condenser comprising a frame, insulation strips at the sides thereof, a group of stator plates arranged in spaced parallel relation within said frame, a plurality of spacer combs made of sheet metal shaped and bent to form upper and lower straps each secured to the plates by tongue and slot connections, said plates and combs forming a stator assembly, the lower straps lying in a plane angularly related to the upper straps and coming partially beneath the stator plates, bent connecting portions interconnecting the upper and lower straps, said spacer combs being substantially cut away whereby the bent connecting portions extend transversely of the upper and lower straps and have a width only a fraction of the length of the straps, and means connecting said combs to the insulation strips at the sides of the condenser frame, said means including a threaded block having a length approximately equal to the length of the comb and disposed between a part of the comb and the stator plates, and screws passing through said insulation strips and threaded into said blocks.

19. A variable condenser comprising a frame, insulation strips at the sides thereof, a group of stator plates arranged in spaced parallel relation within said frame, a plurality of spacer combs made of sheet metal shaped and bent to form upper and lower straps each secured to the plates by tongue and slot connections, said plates and combs forming a stator assembly, the lower straps lying in a plane angularly related to the upper straps and coming partially beneath the condenser plates, support means formed from the material of the comb between the upper and lower straps, said combs being cut and weakened between the upper and lower straps, and means connecting the support means of said combs to the insulation strips at the sides of the condenser frame, said means including a block disposed between a part of the support means and the stator plates, and a threaded member passing through said insulation strips to said block.

SAMUEL COHEN.